(12) United States Patent
Kleinlogel et al.

(10) Patent No.: US 6,779,712 B2
(45) Date of Patent: Aug. 24, 2004

(54) FLOW SENSOR AND METHOD FOR PRODUCING THE SAME

(75) Inventors: Christoph Kleinlogel, Zürich (CH); Ralph Steiner-Vanha, Zürich (CH); Felix Mayer, Zürich (CH)

(73) Assignee: Sensirion AG, Zurich (CH)

( * ) Notice: Subject to any disclaimer, the term of this patent is extended or adjusted under 35 U.S.C. 154(b) by 0 days.

(21) Appl. No.: 10/406,862

(22) Filed: Apr. 3, 2003

(65) Prior Publication Data

US 2004/0000196 A1 Jan. 1, 2004

(51) Int. Cl.[7] .............................................. B23K 31/02
(52) U.S. Cl. ................................. 228/180.22; 228/246
(58) Field of Search ......................... 228/180.22, 245, 228/246; 257/737, 738; 73/260; 438/613

(56) References Cited

U.S. PATENT DOCUMENTS

| | | | | |
|---|---|---|---|---|
| 4,548,078 A | * | 10/1985 | Bohrer et al. | ............. 73/204.22 |
| 4,829,818 A | * | 5/1989 | Bohrer | .................... 73/204.22 |
| 5,081,866 A | | 1/1992 | Ochiai et al. | ............. 73/204.21 |
| 5,228,329 A | | 7/1993 | Dennison | .................... 73/49.1 |
| 5,705,745 A | | 1/1998 | Treutler et al. | ........... 73/204.26 |
| 6,187,609 B1 | * | 2/2001 | Smith et al. | ................... 438/64 |
| 6,351,390 B1 | | 2/2002 | Mayer et al. | ................ 361/760 |
| 6,443,179 B1 | * | 9/2002 | Benavides et al. | ....... 137/454.2 |
| 6,502,459 B1 | * | 1/2003 | Bonne et al. | ............. 73/170.11 |
| 6,548,895 B1 | * | 4/2003 | Benavides et al. | .......... 257/712 |
| 6,600,202 B1 | * | 7/2003 | Smith et al. | ................. 257/422 |
| 6,617,963 B1 | * | 9/2003 | Watters et al. | ........... 340/10.41 |
| 2002/0190839 A1 | * | 12/2002 | Padmanabhan et al. | ....... 338/13 |
| 2003/0098771 A1 | * | 5/2003 | Padmanabhan et al. | ....... 338/25 |
| 2004/0000196 A1 | * | 1/2004 | Kleinlogel et al. | ...... 73/861.11 |
| 2004/0021185 A1 | * | 2/2004 | Oberhardt et al. | .......... 257/414 |
| 2004/0050155 A1 | * | 3/2004 | Okazaki et al. | .......... 73/204.22 |

FOREIGN PATENT DOCUMENTS

| | | | |
|---|---|---|---|
| EP | 1351039 A1 | * 10/2003 | |
| GB | 1035324 | 7/1966 | |
| WO | WO84087 A1 | 11/2001 | ........... G01F/1/684 |
| WO | WO84099 A1 | 11/2001 | ............ G01K/7/02 |

OTHER PUBLICATIONS

Search Report of Sep. 16, 2002, issued in European application corresponding to the present application and showing the European Examiner's assessment of the relevance of prior art cited therein.

* cited by examiner

*Primary Examiner*—Kiley Stoner
(74) *Attorney, Agent, or Firm*—Cooper & Dunham LLP; Donald S. Dowden

(57) ABSTRACT

The invention relates to a flow sensor comprising a substrate with integrated heat source and temperature sensors. Solder bumps are arranged on the heat source and the temperature sensors and the substrate is attached to the outside of a tube using flip chip technology. Preferably, the outside of the tube is structured for being wetted at appropriate positions by the solder. This allows to assemble the sensor easily and accurately.

17 Claims, 2 Drawing Sheets

FLOW SENSOR AND METHOD FOR PRODUCING THE SAME

CROSS REFERENCE TO RELATED APPLICATIONS

This application claims the priority of European patent application 02007292.2, filed Apr. 3, 2002, the disclosure of which is incorporated herein by reference in its entirety.

BACKGROUND OF THE INVENTION

The invention relates to a flow sensor having a semiconductor chip with an integrated detector as well as to a method for producing the same. It also relates to a substrate to be used as semiconductor chip in such a sensor.

WO 01/84087 describes a flow sensor comprising a tube for the fluid to be measured and a semiconductor chip having a heat source and two temperature sensors. In one embodiment, gold or copper metal bumps are placed on the heat source and the temperature sensors. The chip is placed with the bumps against the tube and glued thereto. The gold and metal bumps provide a thermal connection between the tube surface and the heat source and temperature sensors, respectively.

BRIEF SUMMARY OF THE INVENTION

Hence, it is a general object of the invention to provide a method, a sensor and a substrate of the type mentioned above that allow efficient production.

Now, in order to implement these and still further objects of the invention, which will become more readily apparent as the description proceeds, the method comprises the steps of providing a tube for containing a fluid to be measured, providing a substrate with a flow detector integrated thereon, said flow detector having at least one heat source and at least one temperature sensor, applying solder bumps to said heat source and said temperature sensor and/or to said tube, placing said substrate against said tube and applying heat for melting said solder bumps, such that, after cooling, said solder bumps form a first thermal connection between said heat source and said tube and a second thermal connection between said temperature sensor and said tube, wherein the thermal connections are located at a distance from each other.

In a further aspect the invention relates to a method for producing a flow sensor, said sensor comprising a tube for containing a fluid to be measured and a substrate with at least one flow detector arranged thereon, said flow detector having at least one heat source and at least one temperature sensor, said method comprising the steps of applying solder bumps to said heat source and said temperature sensor and/or to said tube, attaching said substrate to said tube using flip chip technology by melting said solder bumps, such that, after cooling, said solder bumps form a first thermal connection between said heat source and said tube and a second thermal connection between said temperature sensor and said tube, wherein the thermal connections are located at a distance from each other.

In yet another aspect, the invention relates to a flow sensor comprising a tube for containing a fluid to be measured, a semiconductor substrate with a flow detector integrated thereon, said flow detector having at least one heat source and at least one temperature sensor, solder bumps arranged between said heat source and said tube and between said temperature sensor and said tube, said solder bumps being soldered to said tube and said heat source or that temperature sensor, respectively, and forming a first thermal connection between said heat source and said tube and a second thermal connection between said temperature sensor and said tube, wherein the thermal connections are located at a distance from each other.

In a final aspect, the invention relates to a semiconductor substrate for a flow sensor, said semiconductor substrate comprising a flow detector integrated on the substrate, said flow detector having at least one heat source and at least one temperature sensor, at least one first solder bump arranged on said heat source and at least one second solder bump arranged on said temperature sensor for attaching said substrate to a tube using flip-chip technique.

The invention relies on the concept of using the "flip chip" technique for applying the substrate to the tube. This technique is conventionally used for electrically connecting semiconductor chips to flat substrates, such as printed circuit boards.

For this purpose, solder bumps are applied to the heat source and the temperature sensors(s) and/or to the tube. The substrate is placed against the tube and heat is applied for melting the solder bumps. After cooling, the solder bumps form thermal connections between the heat source and the tube and between the temperature sensor(s) and the tube, respectively.

Preferably, a structure is applied to the tube before placing the substrate against it. This structure provides regions of differing wettability, i.e. that are wetted differently by liquid solder, and it is matched to the positions of the solder bumps. This allows a controlled wetting of the tube surface by the solder bumps. It prevents undesired thermal bridges between the bumps and, due to surface tension forces, helps to align the substrate correctly against the tube.

If the tube has a curved surface, the structure is preferably created by applying a flexible photomask against it.

The invention also relates to a flow sensor that can be produced with this method as well as to a substrate to be used for producing such a flow sensor. The substrate is provided with a first solder bump arranged on the heat source and a second solder bump arranged on the temperature sensor(s) so that the substrate can be applied to a tube using the flip chip technique.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE INVENTION

Figure 1:
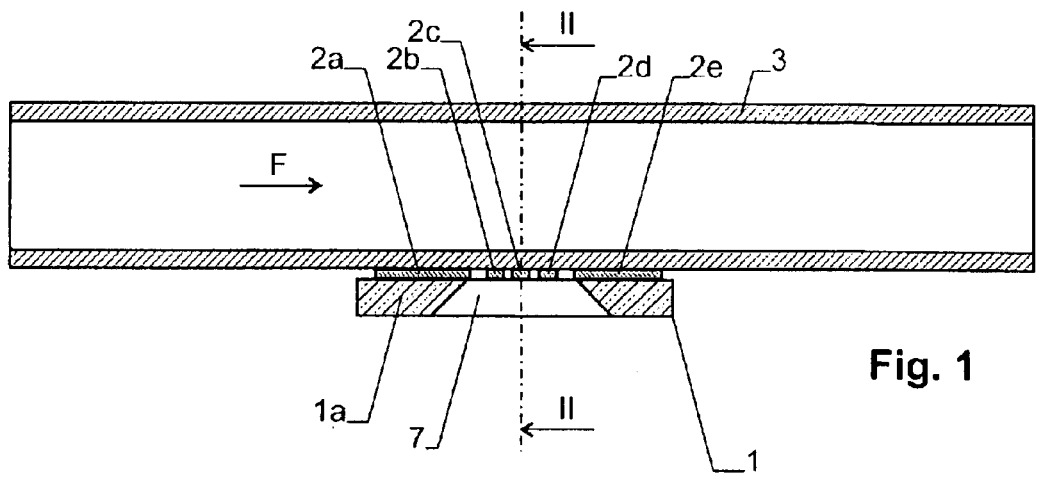
FIG. 1 a sectional view of a preferred embodiment of the invention.
Figure 2:
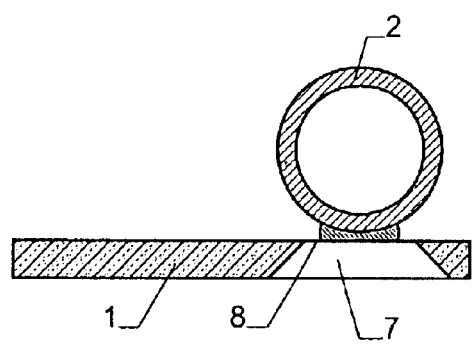
FIG. 2 a sectional view along line II—II of FIG. 1.
Figure 3:
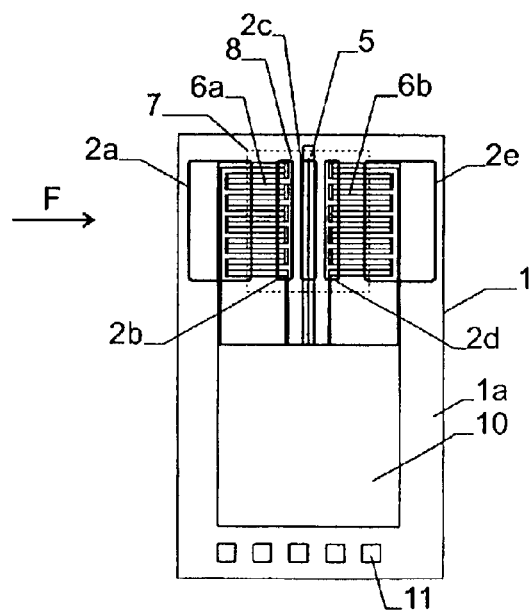
FIG. 3 a top view of the substrate of the sensor where the solder bumps are drawn transparently in thick lines, and FIG. 4 a top view of the substrate of an alternative embodiment.

The basic set-up of a preferred embodiment of a flow sensor according to the present invention in shown in FIGS. 1–3. It consists of a substrate 1 formed by a semiconductor chip with a flow detector integrated thereon. Solder bumps 2a–2e are arranged at a distance from each other on substrate 1 and connected to a tube 3. Tube 3 is a duct for the fluid to be measured. The fluid is a liquid or a gas.

As it is best seen in FIG. 3, substrate 1 carries a heat source 5, such as an integrated resistor. Before and after heat source 5 (as seen in flow direction F) there are two temperature sensors 6a, 6b. In the present embodiment, these temperature sensors are implemented as thermopiles.

Substrate 1 consists of a frame 1a surrounding an opening 7. A thin dielectric membrane 8 is suspended within frame 1a and covers opening 7. The heat source 5 as well as the contact rows of the thermopiles 6a, 6b adjacent to it are fully arranged on membrane 8. This arrangement reduces thermal conduction between heat source 5 and the temperature sensors.

As it is known by a person skilled in the art, such an arrangement forms a detector for measuring the mass flow of a fluid. A fluid led over the detector distorts the symmetry of the heat field generated by heat source 5, which can be measured by the thermopiles 6a, 6b. While the outer contact rows of the thermopiles are in thermal contact with the thick frame 1a, the inner rows form temperature sensors for measuring the distortion of the heat field.

Heat source 5 and thermopiles 6a, 6b are covered by a passivation layer (not shown), e.g. of silicon nitride or silicon oxide.

In the present embodiment, a total of five solder bumps 2a–2e are arranged on substrate 1. One solder bump 2c is located on top of heat source 5, one (2b and 2d) on top of each of the contact rows of the thermopiles 6a, 6b adjacent to heat source 5. Two large solder bumps 2a, 2e are located on frame 1a in front and after the thermopiles.

Solder bump 2c forms a first thermal connection between heat source 5 and tube 3. Solder bumps 2b and 2d form second thermal connections between the temperature sensors and tube 3. Hence, these solder bumps allow to transfer the heat from heat source 5 to tube 3 and keeps the temperature of the temperature sensors substantially equal to the temperature of tube 3 before and after heat source 5.

For analyzing the signals from the thermopiles 6a, 6b, in integrated signal processor 10 is arranged on substrate 1. It e.g. comprises a preamplifier, an analog-digital converter and digital processing circuitry, e.g. for line-arising and scaling of the signal. It also comprises the circuitry for driving heat source 5. Contact pads 11 are provided for connecting the substrate to its surroundings, e.g. using wire bonds.

The sensor of FIGS. 1–3 is preferably manufactured as follows:

In a first step, tube 3 and substrate 1 are manufactured separately.

Substrate 1 with heat source 5, thermopiles 6a, 6b and signal processor 10 is prepared in conventional manner with opening 7 being prepared by etching and membrane 8 being formed by a dielectric coating not affected by the etching of opening 7.

In a next step, underbump metallizations (UBM) are applied at the areas where the solder bumps 2 are to be placed. The purpose of a UBM is to provide a diffusion barrier and a non-oxidising surface that can be wetted by the solder. The UBM can e.g. have a first layer acting as a diffusion stop (e.g. titanium tungsten, TiW), a second layer acting as a wetting layer (e.g. copper), and a third thin layer acting as a protective layer (e.g. gold). These layers are e.g. applied by sputtering or plating and are patterned with photolithography. Then, the actual solder bumps 2 are applied to the UBM. The corresponding techniques are known from flip chip technology.

Preferably, tube 3 is also provided with a structure for receiving the solder. For instance, if the tube is stainless steel, it is not suited for direct soldering and can e.g. be provided with a metal layer that can be wetted by the solder, such as a gold or copper layer, which preferably has a structure matching the one of the solder bumps 2a–2e on substrate 1. Depending on the material of tube 3 and the desired manufacturing techniques, the structure on tube 3 can e.g. also consist of a homogeneous area that is easily wetted by solder and that is selectively covered by a structured layer of solder resist in those places where no solder is desired.

For patterning the structure on tube 3, one or more photomasks can be used. Because the surface of tube 3 may be curved (as can be seen in FIG. 2) the photomasks should be flexible such that they can be brought into full contact with the tube's surface.

Alternatively, suitable imaging optics can be used to project the mask onto tube 3.

Optionally, tube 3 may also be provided with solder bumps, i.e. solder bumps are attached to the tube and the substrate before they are brought into contact.

After preparing tube 3 and substrate 1 in this manner, they are placed against each other and heated. The solder bumps 2a–2e melt to form the desired thermal connections between tube 3 and substrate 1.

As is shown in FIG. 2, it is found that the solder bumps establish a good thermal connection even if the surface of tube 3 is curved because they tend to "follow" the contour of a surface.

In the following, various further preferred aspects and embodiments of the invention are discussed.

As can be seen from FIG. 3, the solder bumps 2b, 2c and 2d over the heat source and the temperature sensors are preferably arranged completely on the membrane, i.e. they do not extend over the frame. This reduces undesired thermal conduction between them.

The solder bumps 2b, 2c and 2d over the heat source and the temperature sensors are preferably elongate with their largest extension extending perpendicular to tube 2 and flow direction F, which allows to obtain a large area of thermal contact even though the distance between the bumps is small. A typical size of a solder bump for the heat source or the temperature sensors is e.g. 40 $\mu$m×160 $\mu$m with a typical thickness between 1 and 50 $\mu$m.

The solder bumps 2a, 2e over frame 1a are not required for the operation of the device but they reduce undesired mechanical stress on membrane 8 and improve the mechanical connection between substrate 1 and tube 2.

Figure 4:
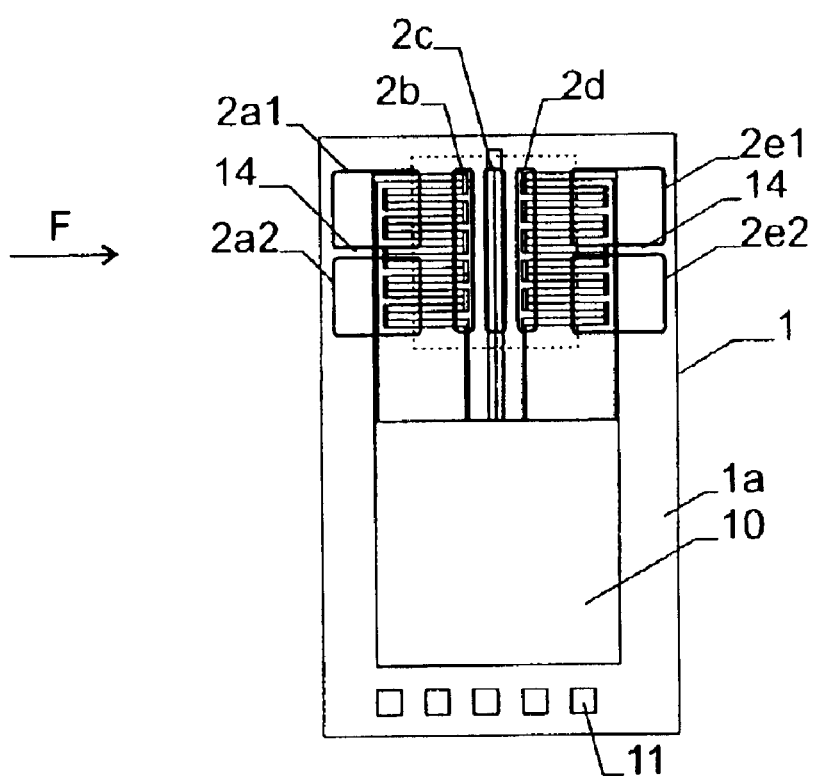

In order to position tube 2 more accurately, at least some of the solder bumps, especially the bumps 2a and 2e over frame 1a, can be provided with a central groove or gap extending parallel to tube 3, as it is shown in FIG. 4. This figure depicts an embodiment where bumps 2a and 2e have each been split by a central gap 14 into two bumps 2a1, 2a2 and 2e1, 2e2. This gap or groove provides a mechanical seat for positioning tube 3 prior to soldering.

To further strengthen the connection between substrate 1 and tube 3, a hardening filler, e.g. a resin, can be introduced between the same after soldering. This filler must have much lower thermal conductivity than the solder bumps in order to avoid a thermal shortcut between them. The filler can also cover substrate 1 in order to protect it.

As mentioned above, substrate 1 is preferably a semiconductor chip, which allows direct integration of the various components of the flow detector. However, the substrate can also be formed by another material, such as a ceramics wafer, with heater and temperature sensor(s) arranged e.g. as film layers thereon.

The solder bumps may also be applied to tube 3.

In the embodiments shown so far, the flow detector comprises a heat source symmetrically arranged between two temperature sensors. The concepts of the present invention can, however, also be applied to other types of thermal flow sensors comprising a heat source and at least one temperature sensor, such as to device having only one heat source and one temperature sensor or a device where the heat source also acts as a temperature sensor.

While there are shown and described presently preferred embodiments of the invention, it is to be distinctly understood that the invention is not limited thereto but may be otherwise variously embodied and practised within the scope of the following claims.

What is claimed is:

1. A method for producing a flow sensor comprising the steps of
    providing a tube for containing a fluid to be measured,
    providing a substrate with a flow detector integrated thereon, said flow detector having at least one heat source and at least one temperature sensor,
    applying solder bumps to said heat source and said temperature sensor and/or to said tube,
    placing said substrate against said tube and applying heat for melting said solder bumps, such that, after cooling, said solder bumps form a first thermal connection between said heat source and said tube and a second thermal connection between said temperature sensor and said tube, wherein the thermal connections are located at a distance from each other.

2. The method of claim 1 wherein said substrate is a semiconductor chip and wherein said flow detector is integrated on said semiconductor chip.

3. The method of claim 1 comprising the step of applying a structure on said tube before placing said substrate against said tube, said structure providing regions of differing wettability by liquid solder and being matched to a position of said bumps.

4. The method of claim 3 wherein said structure comprises structured metal layer on said tube.

5. The method of claim 3 wherein said structure comprises a structured solder resist layer on said tube.

6. The method of claim 1 wherein said tube has a curved surface.

7. The method of any of claim 6 comprising the step of applying a structure on said tube before placing said substrate against said tube, said structure providing regions of differing wettability by liquid solder and being matched to a position of said bumps, wherein said structure is applied by placing a flexible photomask against said curved surface.

8. The method of claim 1 wherein solder bumps are applied to said tube in addition to the solder bumps on said substrate prior to bringing said tube and said substrate into contact.

9. The method of claim 1 wherein said solder bumps are elongate areas with a largest extension extending perpendicular to said tube.

10. The method of claim 1 wherein said substrate comprises a frame and a membrane arranged in said frame, wherein the heat source and the temperature sensor each are at least partially arranged on said membrane.

11. The method of claim 10 wherein said solder bumps are arranged completely on said membrane.

12. The method of claim 10 comprising the step of applying further solder bumps on said frame for providing mechanical connection between said substrate and said tube in addition to the solder bumps arranged on the temperature sensor and the heat source.

13. The method of claim 1 further comprising the step of applying a hardening filler between said structure and said tube after having formed said thermal connections, said filler having lower thermal conductivity than said thermal connections.

14. The method of claim 1 wherein at least one solder bump with a groove or gap is formed on the substrate, which groove or gap provides a seat for positioning the tube prior to soldering.

15. The method of claim 1 comprising the step of applying solder bumps to said heat source and said temperature sensor.

16. The method of claim 1 comprising the step of applying a metal layer to said tube, which metal layer is wettable by solder.

17. A method for producing a flow sensor, said sensor comprising a tube for containing a fluid to be measured and a substrate with at least one flow detector arranged thereon, said flow detector having at least one heat source and at least one temperature sensor, said method comprising the steps of
    applying solder bumps to said heat source and said temperature sensor and/or to said tube,
    attaching said substrate to said tube using flip chip technology by melting said solder bumps, such that, after cooling, said solder bumps form a first thermal connection between said heat source and said tube and a second thermal connection between said temperature sensor and said tube, wherein the thermal connections are located at a distance from each other.

* * * * *